(12) United States Patent
Ding et al.

(10) Patent No.: US 7,725,724 B2
(45) Date of Patent: May 25, 2010

(54) DIGITAL SIGNATURE METHOD BASED ON BRAID GROUPS CONJUGACY AND VERIFY METHOD THEREOF

(75) Inventors: Yong Ding, Shenzhen (CN); Jianyong Chen, Shenzhen (CN); Zhiwei Peng, Shenzhen (CN)

(73) Assignee: ZTE Corporation, Zhenzhen (CN)

( * ) Notice: Subject to any disclaimer, the term of this patent is extended or adjusted under 35 U.S.C. 154(b) by 11 days.

(21) Appl. No.: 10/579,801

(22) PCT Filed: Nov. 12, 2004

(86) PCT No.: PCT/CN2004/001289

§ 371 (c)(1),
(2), (4) Date: May 15, 2006

(87) PCT Pub. No.: WO2005/048525

PCT Pub. Date: May 26, 2005

(65) Prior Publication Data

US 2007/0104322 A1  May 10, 2007

(30) Foreign Application Priority Data

Nov. 13, 2003 (CN) ........................ 2003 1 0113604

(51) Int. Cl.
*H04L 9/32* (2006.01)

(52) U.S. Cl. ........................... 713/176; 713/1; 713/177; 713/188; 713/180; 713/181; 713/187; 380/28; 380/29; 380/30; 380/277

(58) Field of Classification Search ............. 380/28–30, 380/277; 713/1, 176–177, 188, 180, 181, 713/187

See application file for complete search history.

(56) References Cited

U.S. PATENT DOCUMENTS

| 7,133,523 | B2 * | 11/2006 | Campagna et al. | ............ 380/28 |
| 2002/0001382 | A1 * | 1/2002 | Anshel et al. | .................. 380/30 |
| 2004/0240672 | A1 * | 12/2004 | Girault et al. | ................ 380/277 |

FOREIGN PATENT DOCUMENTS

WO    WO9944324 A    9/1999

(Continued)

OTHER PUBLICATIONS

Ki Hyoung Ko, Doo Ho Choi, Mi Sung Cho, and Jang Won Lee, "New Signature Scheme Using Conjugacy Problem", pp. 1-13, Nov. 11, 2002.*

(Continued)

*Primary Examiner*—Christian LaForgia
*Assistant Examiner*—Canh Le
(74) *Attorney, Agent, or Firm*—Stevens Law Group; David R. Stevens (57) ABSTRACT

The present invention discloses a digital signature scheme based on braid group conjugacy problem and a verifying method thereof, wherein a signatory S selects three braids $x \in LB_m(l)$, $x' \in B_n(l)$, $a \in B_n(l)$, and considers braid pair $(x',x)$ as a public key of S, braid a as a private key of S; Signatory S uses hash function h for a message M needing signature to get $y=h(M) \in B_n(l)$; generating a braid $b \in RB_{n-1-m}(l)$ randomly, then signing M with a and b to obtain $Sign(M)=a^{-1}byb^{-1}a$; a signature verifying party V obtains the public key of S, calculating the message M by employing hash function h, obtaining the $y=h(M)$; judging whether sign(M) and y, sign(M)x' and xy are conjugate or not, if yes, sign(M) is a legal signature of message M; the present invention reduces the number of braids involved and the number for conjugacy decision without reducing security, thereby improving the operation efficiency of signature.

13 Claims, 6 Drawing Sheets

FOREIGN PATENT DOCUMENTS

| | | |
|---|---|---|
| WO | WO03036863 A | 5/2003 |
| WO | WO03075582 A | 9/2003 |

OTHER PUBLICATIONS

Ki Hyoung Ko, Sang Jin Lee, Jung Hee Cheon, Jae Woo Han, Ju-sung Kang, and Choonsik Park, "New public-Key Crystosystem Using Braid Groups", CRYPTO 2000, LNCS 1880, pp. 166-183, 2000.*

Ko K. H.et al: "New Signature Scheme Using Conjugacy Problem", Cryptology Eprint Archive; Report 2002/168.

Ki Hyoung Ko et al: "New Public-Key Cryptosystem using Braid Groups" Advances in Cryptology, CRYPTO 2000.

Birman J. S.; Ko K. H; Lee S. J.: "The infimum, supremum and geodesic length of a braid conjugacy class" ARXIV: MATH. GT/003125 V1, Mar. 21, 2000.

\* cited by examiner

DIGITAL SIGNATURE METHOD BASED ON BRAID GROUPS CONJUGACY AND VERIFY METHOD THEREOF

CROSS REFERENCE TO RELATED APPLICATION

This application claims the priority benefit of PCT/CN2004/001289 filed on Nov. 12, 2004.

TECHNICAL FIELD

The present relates to a digital signature scheme based on a gap between the conjugacy search problem (CSP) and the conjugacy determination problem (CDP) in the braid group and a verifying method thereof (ECSS), particularly to a method for verifying whether a file is signed by a signatory with his private key by using his public key.

BACKGROUND OF THE INVENTION

Currently, the digital signature technique commonly used is RSA signature mechanism, and its security is established on the difficulty of large number factoring. However, with constant improvement of computer process power and sustained development of related researches, RSA has to continuously increase digits of modulus N to ensure the security, from 512 bits to 1024 bits, further to 2048 bits. Because of the excess length of key bits, the operation for generating big prime number and exponential computation becomes more complex, therefore, the efficiency of RSA is not very high. If the hardware is employed to improve the efficiency, the excess length of bits will result in more complexity and higher cost, and due to the unchangeability of hardware, the use life of hardware becomes shorter, which further increases the cost as a result.

Since Ki Hyoung K O, Sang Jin Lee of Korea proposed a key exchange protocol and public encryption system based on the difficulty of braid groups conjugacy problem (K. H. Ko, S. J. Lee, J. H. Cheon, J. W. Han, J. S. Kang and C. S. Park, *New Public-Key Crytosystem Using Braid Groups, Proc. of Crypto 2000, LNCS* 1880, Springer-Verlag (2000) 166-183.), the braid public key cryptography system is widely researched. However, there has been no good solution for its digital signature scheme. Up to 2003, Ki Hyoung K O, Doo Ho Cho, the scholars of Korea, proposed and realized two signature schemes based on braid conjugacy problem (Ki Hyoung Ko and Doo Ho Choi and Mi Sung Cho and Jang Won Lee *New Signature Scheme Using Conjugacy Problem Cryptology ePrint Archive: Complete Contents* 2003/168): simple conjugacy signature scheme (SCSS) and conjugacy signature scheme (CSS). We will explain the two signature schemes of SCSS and CSS.

Simple conjugacy signature scheme SCSS:
Common parameter: braid group $B_n$, hash function h: $\{0,1\}^* \to B_n$
Key generation: public key: a conjugacy pair $(x,x') \in B_n \times B_n$ for considering CSP problem as a difficult problem,
private key: $a \in B_n$, meeting $x'=a^{-1}xa$;
Signature: for a given bit sequence message M, the signature of M sign(M)=$a^{-1}ya$, in which, element y=h(M);
Verify: the signature of message M sign(M) is legal when and only when: sign(M)~y and x' sign(M)~xy.

However, since a hacker may get many pairs of $(y_i, a^{-1}y_i a)$, it may result in blowing the gab of private key a, i.e., k-CSP problem. In order to overcome the above problem, they proposed a CSS signature scheme.

Conjugacy signature scheme CSS:
Common parameter: braid group $B_n$, hash function h: $\{0,1\}^* \to B_n$
Key generation: public key: a conjugacy pair $(x,x')' \in B_n \times B_n$ for considering CSP problem as a difficult problem,
private key: $a \in B_n$, meeting $x'=a^{-1}xa$;
Signature: for a given message M, selecting a random braid $b \in B_n$ at random, calculating $\alpha = b^{-1}xb$, $y=h(M\|\alpha)$, $\beta=b^{-1}yb$, $\gamma=b^{-1}aya^{-1}b$, the signature of message M sign(M)=$(\alpha, \beta, \gamma)$.

Verify: the signature of message M sign(M)=$(\alpha, \beta, \gamma)$ is legal when and only when meeting $\alpha$~x, $\beta$~y, $\alpha\beta$~xy, $\alpha\gamma$~x'y.

Due to the introduction of random braid b, CCS signature scheme overcomes the k-CSP problem well. But due to the increase of calculation and data, the overall efficiency is decreased distinctly.

SUMMARY OF THE INVENTION

In order to overcome the problem of excess consumption of computer calculation resource in generating big prime number and dividing hack of big number, and the problem of taking excess time to generate key and verify signature due to the increased calculation and data used for CSS to resolve the k-CSP problem in the SCSS, the object of the present is to provide a digital signature scheme based on braid groups conjugacy problem and a verifying method thereof, for reducing the calculation and data, and improving the efficiency of the whole signature scheme.

In order to realize the above objects, the present invention provides a digital signature scheme based on braid group conjugacy problem, in which parameters involved include a signatory S, a signature verifying party V, a message M needing signature; system parameters needed include n for the number of generators in the braid group, m for the number of generators in the left subgroup, l for the upper bound of the length of a braid, braid group $B_n(l)$, left subgroup $LB_m(l)$ of $B_n(l)$, right subgroup $RB_{n-1-m}(l)$ of $B_n(l)$, one way hash function h mapping from bit sequence $\{0,1\}^*$ to braid group $B_n(l)$; the signature scheme comprises the following steps of:

Step 1. the signatory S selecting three braids $x \in LB_m(l)$, $x' \in B_n(l)$, $a \in B_n(l)$, and making them meet $x'=a^{-1}xa$, moreover, with known x and x', it being impossible to find a in calculation, and considering braid pair (x',x) as a public key of S, braid a as a private key of S;

Step 2. the signatory S using hash function h for message M needing signature to get y=h(M)$\in B_n(l)$;

Step 3. generating a braid $b \in RB_{n-1-m}(l)$ at random, then signing the message M with own private key a and the generated random braid b to obtain Sign(M)=$a^{-1}byb^{-1}a$; and Step 4. the signatory S outputting message M and the signature of M Sign(M).

in which, generating public key braid pair (x',x) and private key braid a of the signatory S in said step 1 comprises the following steps of:

Step 1a. selecting the distance d between public key pairs of system parameter braid group;

Step 1b. representing x as left canonial form $x=\Delta^u \pi_1 \pi_2 \ldots \pi_1$;

Step 1c. selecting a braid b at random to belong to set $B_n(5 l)$

Step 1d. calculating $x'=b^{-1}xb$, a=b;

Step 1e. generating a bit at random, if 1, calculating x'=decycling(x'), $a=a\pi_1$; otherwise, calculating x'=cycling (x'), $a=a\tau^u(\pi_1)$; and Step 1f. judging whether x' belongs to the supper summit set SSS(x) and whether l(x')≦d, if all conditions are yes, outputting (x, x') as public key, a as private key; if either of them is not, performing step 1e.

The process of using hash function h for obtaining y=h(M) ∈$B_n$(l) in said step 2 comprises the following steps of:

Step 2a. selecting an ordinary hash function H, with the length of its output H(M) being l [ log(2,n!)], then dividing H(M) into l sections $R_1 \| R_2 \| \ldots \| R_1$ in equal at one time; and Step 2b. corresponding Ri to permutation braid Ai, then calculating h(A)=A1*A2 . . . Al, the h(AA) required.

The present invention further provides a verifying method of the digital signature scheme based on braid group conjugacy problem, which comprises the following steps of:

Step 1. a signature verifying party V obtaining a public key of signatory S after receiving a message M and the signature of M Sign(M) transmitted from a signatory S;

Step 2. calculating the message M by employing a system parameter hash function h, to obtain y=h(M);

Step 3. judging whether sign(M) and y are conjugate or not, if not, sign(M) being not a legal signature, and the verification being failed; if yes, performing step 4; and Step 4. calculating sign(M) x' and xy by using the public key of S obtained, and judging whether they are conjugate or not, if not, then sign(M) being not a legal signature, the verification being failed; if yes, sign(M) being the legal signature of message M.

In this method, the form for obtaining public key of the signatory S in step 1 is an out-band form or the form of receiving public key transmitted from the signatory S; Conjugacy decision algorithm in braid groups BCDA is employed in judging whether sign(M) and y are conjugate or not in step 3 and whether sign(M) x' and xy are conjugate or not in step 4.

Moreover, the present invention further provides a digital signature scheme including signatory and verifying party signatures based on braid group conjugacy problem and a verifying method thereof (ECSS), in which parameters involved include a signatory S, a signature verifying party V, a message M needing signature, an integer n for the number of generators in the braid group, an integer m for the number of generators in the left subgroup, an integer l for the upper bound of the length of a braid, braid group $B_n$(l), a left subgroup $LB_m$(l) of $B_n$(l), a right subgroup $RB_{n-1-m}$(l) of $B_n$(l), an one way hash function h mapping from bit sequence {0,1}* to braid groups $B_n$(l); said signature and its verifying method comprises the following steps of:

Step 1. the signatory S selecting three braids x∈$LB_m$(l), x'∈$B_n$(l), a∈$B_n$(l), and making them meet x'=$a^{-1}$a, moreover, with known x and x,' it being impossible to find a in calculation, and considering braid pair(x',x) as a public key of S, braid a as a private key of S;

Step 2. signatory S using hash function h for the message M needing signature to get y=h(M)∈$B_n$(l);

Step 3. generating a braid b∈$RB_{n-1-m}$(l) at random, then signing the message M with own private key a and the generated random braid b to obtain Sign(M)=$a^{-1}byb^{-1}a$;

Step 4. the signatory S transmitting message M and the signature of M Sign(M) to the signature verifying party V;

Step 5. the signature verifying party V obtaining the public key of S after receiving the message M and signature of M Sign(M) transmitted from signatory S;

Step 6. calculating message M by employing system parameter hash function h, to obtain y=h(M);

Step 7. judging whether sign(M) and y are conjugate or not, if not, sign(M) being not a legal signature, the verification being failed; if yes, performing step 8; and Step 8. calculating sign(M) x' and xy by using the public key of obtained S, and judging whether they are conjugate or not, if not, sign(M) being not a legal signature, the verification being failed; if yes, sign(M) being the legal signature of message M.

As recited in the above solution, the digital signature and the verifying method provided by the present invention have the following advantages:

Because of adding random braid b, for each message M, the conjugacy element of conjugacy pair (sign(M), h(M)) is $b^{-1}a$; because b is a random braid, and b selected for each signature is different, the conjugacy element for each time is also different, averting the information leakage of private a, and avoiding the k-CSP problem for only using private a as the conjugacy element of (sign(M), h(M)) in SCSS signature scheme of the prior art. The signature scheme ECSS provided by the present invention makes use of the exchangeability of the left subgroup and the right subgroup of the braid groups, and adds a random braid directly, for protecting the secret information of key and improving the security of signature algorithm. CSS protects the secret information of key by introducing two assistant braids. The biggest advantage of ECSS compared to CSS is in that it reduces the number of braids involved and the number for conjugacy decision without reducing the security, and, therefore, improves the operation efficiency of signature. The differences of these three signature schemes are listed in table 1:

TABLE 1

| Signature scheme | Calculation number of signature | Verify number of signature | Data quantity of signature | Security |
|---|---|---|---|---|
| SCSS | conjugacy calculation: 1 time<br>hash calculation: 1 time | conjugacy decision: 2 times<br>hash calculation: 1 time<br>braid group operation: 2 times | 1 braid | Having k-CSP problem, low security, based on MCSP problem |
| CSS | Conjugacy calculation: 4 times<br>hash calculation: 1 time | conjugacy decision: 4 times<br>hash calculation: 1 time<br>braid group operation: 4 times | 3 braids | Introducing random key factor, resolving the k-CSP problem, based on MTSP problem |
| Scheme of the present invention (ECSS) | conjugacy calculating: 2 times<br>hash calculating: 1 time | conjugacy decison: 2 times<br>hash calculation: 1 time<br>braid group operation: 2 times | 1 braid | Introducing random key factor, resolving the k-CSP problem, based on MCSP problem |

The present invention uses mathematics basis with a completely different scheme compared to conventional RSA signature, and does not need generating big prime number, therefore greatly saves the digits of key and digits of signature, economizes the calculation resource, and improves the efficiency of signature and verification. The CSS signature scheme provided in prior art gets data shown in table 2 on the processor of Pentium III 866 MHz (in which, default setup parameter l=3, d=4, $2^{31}<p<2^{32}$, r=3):

TABLE 2

| n | Number of public key bit | Number of signature | Time for generating key | Time of signature | Time of verification | Strength of security |
|---|---|---|---|---|---|---|
| 20 | 370 | 1653 | 17.82 ms | 18.68 ms | 30.87 ms | $2^{220}$ |
| 24 | 478 | 2138 | 21.70 ms | 22.79 ms | 41.75 ms | $2^{356}$ |
| 28 | 591 | 2648 | 24.42 ms | 25.77 ms | 59.59 ms | $2^{530}$ |

Since the time of signature and verification of the present scheme will be greatly reduced compared to CSS signature, it is more efficiency than RSA.

DETAILED DESCRIPTION OF EMBODIMENTS

Because the present invention involves a series of mathematic principles, its mathematic background will be explained first in the following:

Braid group $B_n$ (n is the parameter of group) is an infinite group with finite representation, generated by Artin generators $\sigma_1, \sigma_2, \ldots, \sigma_{n-1}$, which meet the following equation:

$$\sigma_i\sigma_j=\sigma_j\sigma_i(|i-j|>1, 1<i,j<n) \quad (1)$$

$$\sigma_i\sigma_j\sigma_i=\sigma_j\sigma_i\sigma_j(|i-j|>1, 1<i,j<n) \quad (2)$$

The group generated by m generators $\sigma_1, \sigma_2 \ldots \sigma_{m-1}$ of left is called left subgroup of $B_n$, labeled as $LB_m$; and the subgroup generated by n−1−m generators $\sigma_{m+1}, \sigma_{m+2} \ldots \sigma_{n-1}$ of right is called right subgroup of $B_n$, labeled as $RB_{n-1-m}$. It is obviously known from (1) that selecting $(x,y) \in LB_m \times RB_{n-1-m}$ arbitrarily, there is always xy=yx. As for a braid b, if it only contains $\sigma_1, \sigma_2 \ldots \sigma_{n-1}$ instead of $\sigma_1^{-1}, \sigma_2^{-1} \ldots, \sigma_{n-1}^{-1}$, b is called a positive element. As for positive element b, a, if there is a positive element or trivial element c that makes b=ac, then a is called subword of b. The braid $\Delta=(\sigma_1\sigma_2 \ldots \sigma_{n-1})(\sigma_1\sigma_2 \ldots \sigma_{n-2}) \ldots (\sigma_1\sigma_2)(\sigma_1)$ is called fundamental braid of $B_n$. $\Delta$ meets $\Delta b=\tau(b)\Delta$, where $\tau(\sigma_i)=\sigma_{n-i}$ and the subword of $\Delta$ is called permutation braid. The set of all permutation braids is corresponded one to one with $\Sigma n$ of permutations on $\{0,1, L\ n−1\}$. Therefore, the sub-word $\Delta$ can be represented by a permutation $\pi: \{0, 1, \ldots, n-1\} \rightarrow \{0, 1, \ldots, n-1\}$. Any one of braid b has a unique left canonial representation form: $b=\Delta^u\pi_1\pi_2 \ldots \pi_l$, in which, $\pi_i$ is a permutation braid. Several lengths of b are defined as: inf(b)=u, sup(b)=u+l, l(b)=l.

In a braid group $B_n$, if for two braids $x,y \in B_n$, there is a braid $a \in B_n$ that makes $y=a^{-1}xa$, then braids x, y are conjugate, which is denoted as x~y, and braid a is called conjugator of conjugacy pair (x,y), obviously, "~" indicates an equivalent relationship. The basic conjugacy problems of braid group include conjugacy decision problem CDP and conjugacy search problem CSP. The called CDP means: for an arbitrarily given braid pair $(x,y) \in B_n \times B_n$, judging whether x~y is right. A method is given in the existing signature scheme based on braid group conjugacy problem, which can solve the CDP problem with any high probability in multinomial time. The called CSP problem means: for a given conjugacy pair(x,y) $\in B_n \times B_n(x\sim y)$, finding a braid $a \in B_n$, which makes $y=a^{-1}xa$. For braid group, there is no efficient arithmetic which can solve the CSP problem in multinomial time currently, therefore, for a conjugacy pair $(x,y) \in B_n \times B_n$ selected randomly, their CSP problem will be a difficult problem with high probability. While the security of the signature scheme proposed in this description is established on the difficulty of MCSP problem (matching conjugacy search problem), which is proved to have a same difficulty with CSP problem. The called MCSP problem is described in the following:

known: a conjugacy pair $(x,x') \in B_n \times B_n$ of $B_n$; a braid $y \in B_n$
problem: finding a $y' \in B_n$ meeting: y~y' xy~'x'y'

Next, the method described in the appended drawings of the present invention is illustrated in details:

The common parameter required: braid group $B_n$, left braid group $LB_m$, right braid group $RB_{n-1-m}$, hash function h, in which the generators of $B_n$ are $\sigma_1\sigma_2 \ldots \sigma_{n-1}$, the left braid group $LB_m$ is the subgroup of $B_n$ generated by generator $\sigma_1, \sigma_2 \ldots \sigma_{m-1}$, and the right braid group $RB_{n-1-m}$ is the subgroup of $B_n$ generated by $\sigma_{m+1}, \sigma_{m+2} \ldots \sigma_{n-1}$.

Figure 1:
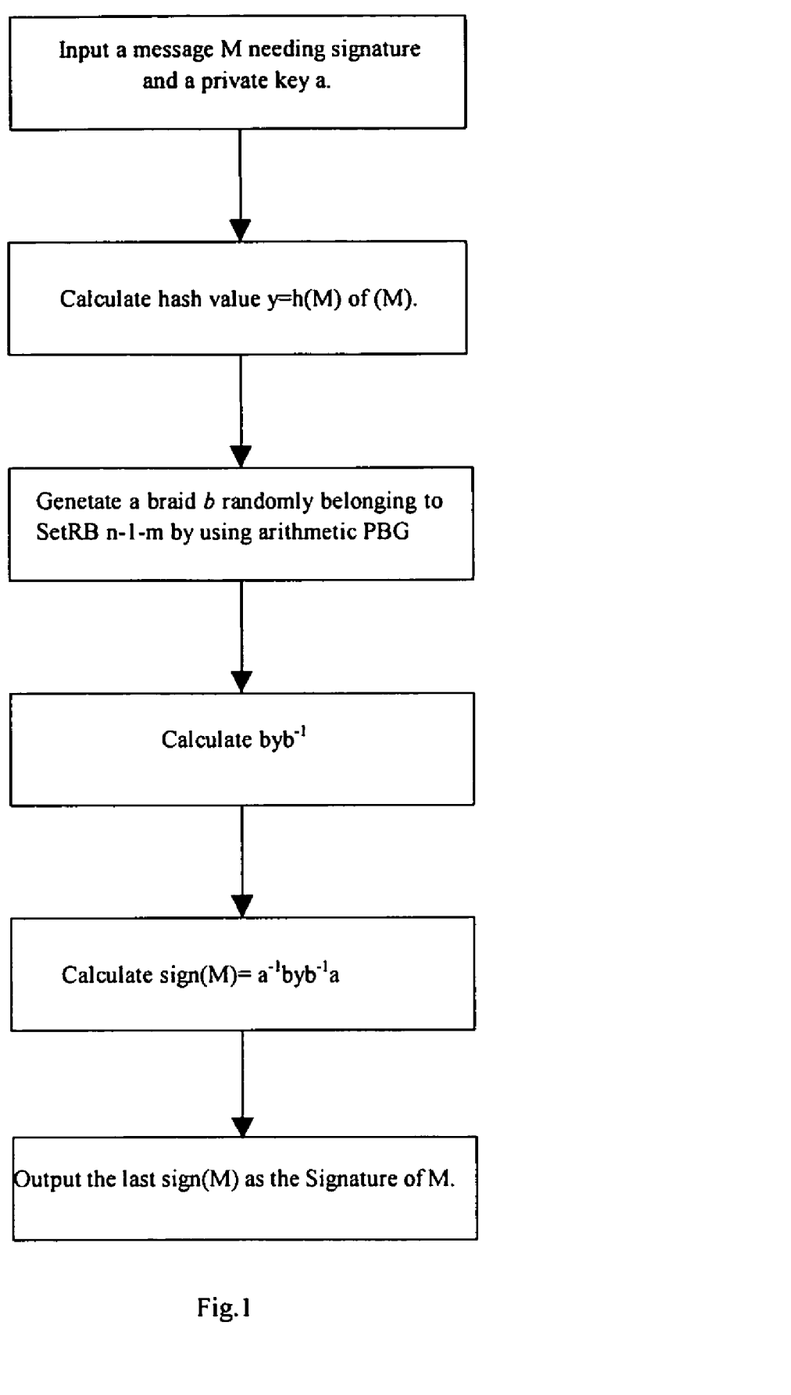
FIG. 1 is the flowchart of a digital signature scheme based on braid group conjugacy problem of the present invention.

Its public key is a conjugacy pair $(x,x') \in LB_m \times B_n$ which considers CSP problem as a difficult problem, and its private key is $a \in B_n$, meeting $x'=a^{-1}xa$;

The flowchart for signatory signing message M is shown in FIG. 1. For a given message M, first calculate and obtain y=h(M) by using hash function h, select a secret random braid $b \in RB_{n-1-m}$ randomly by using arithmetic PBG, and calculate $byb^{-1}$ and the signature of message M sign(M)=$a^{-1}byb^{-1}a$, then, signatory S outputs M and its signature Sign(M).

However, for a hacker, if he wants to forge a signature of message M, what he can know is only the public key(x,x') and y=h(M), if he wants the forged signature sign(M) to meet sign(M)~y. x' sign(M)~xy, it equals to solve the MCSP problem obviously, therefore, it would not be successful. However, for message signature pair($y_i, b^{-1}ay_ia^{-1}b$) that can be analyzed by intercepting and capturing, because of the adding of the random braid b, they can avoid the k-CSP problem. The called k-CSP problem is described in the following:

known: k pairs of conjugacy pair$(x_1, x_1'), \ldots, (x_k, x_k') \in B_n \times B_n$ and $x_i=a^{-1}x_ia=(i=1 \ldots k)$;
problem: finding $b \in B_n$, which makes $x_i=b^{-1}x_ib(i=1, 2 \ldots k)$, in which, in order to generate key safely, first define some concepts, for a braid $x \in B_n(l)$ its super summit set is defined as: $SSS(X)=\{y \in B_n(l) | y\sim x, \inf(y)=\text{Maxinf}(x), \sup(y)=\text{Minsup}(x)\}$. The security strength of overall signature arithmetic is $|SSS(x)|$, about $$\left(\frac{n}{4}\right)^{n(n-1)/2}.$$

Figure 2:
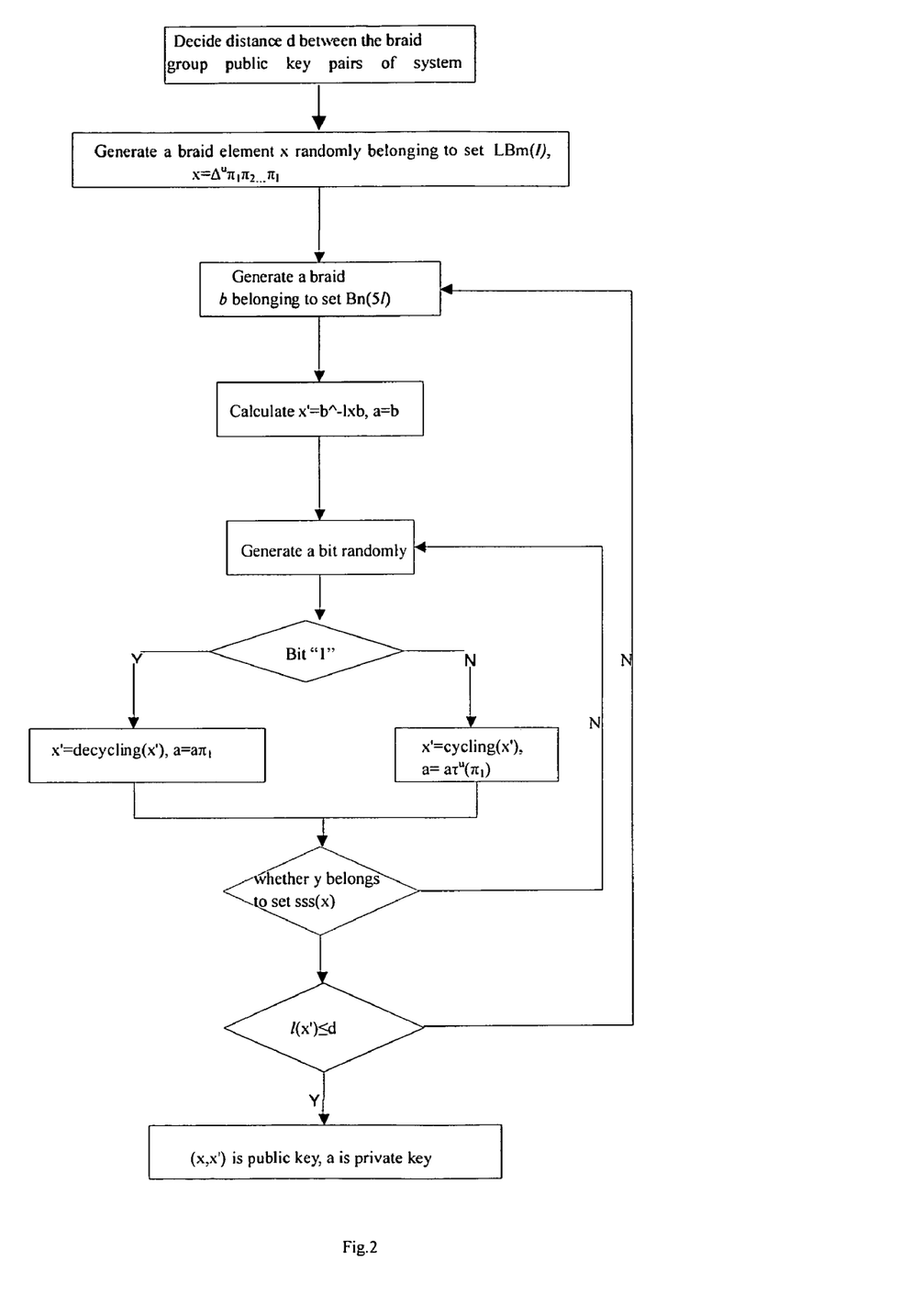
FIG. 2 is the flowchart for generating key in a digital signature scheme based on braid group conjugacy problem of the present invention.

If y~x, then define the distance between x and y as $d(x,y)=\min\{l(b)|=b^{-1}ab\}$, then defines$(x,d)=\{y \in SSS(x)|d(x,y)\leq d\}$. Select $x \in s(x,d)$, then the CSP problem of conjugacy pair(x',x)

becomes a difficult problem, and can be public key. Specifically, the flowchart of key generation is shown in FIG. 2. The following is the detailed description of the process for generating key, wherein by using RSSBG(x,d)=(x',a), x'∈s(x,d) is generated randomly and x'=a$^{-1}$xa, therefore, giving the safe public key(x',x) and private key a:

Step 11. determining the distance d between braid group public key pair;

Step 12. representing braid x as left canonical form x=Δ$^u$π$_1$π$_2$ . . . π$_1$;

Step 13. selecting a braid b randomly which belongs to the set B$_n$(5 l);

Step 14. calculating x'=b$^{-1}$xb, a=b;

Step 15. generating a bit randomly, if 1, then calculating x'=decycling(x'), a=aπ$_1$; otherwise, calculating x'=cycling (x'), a=aτ$^u$(π$_1$); and Step 16. judging whether x' belongs to the set SSS(x) and whether l(x')≦d is yes, if all the results being yes, then outputting(x, x') as public key, a as private key; if either of them is no, then performing step 15.

Figure 3:
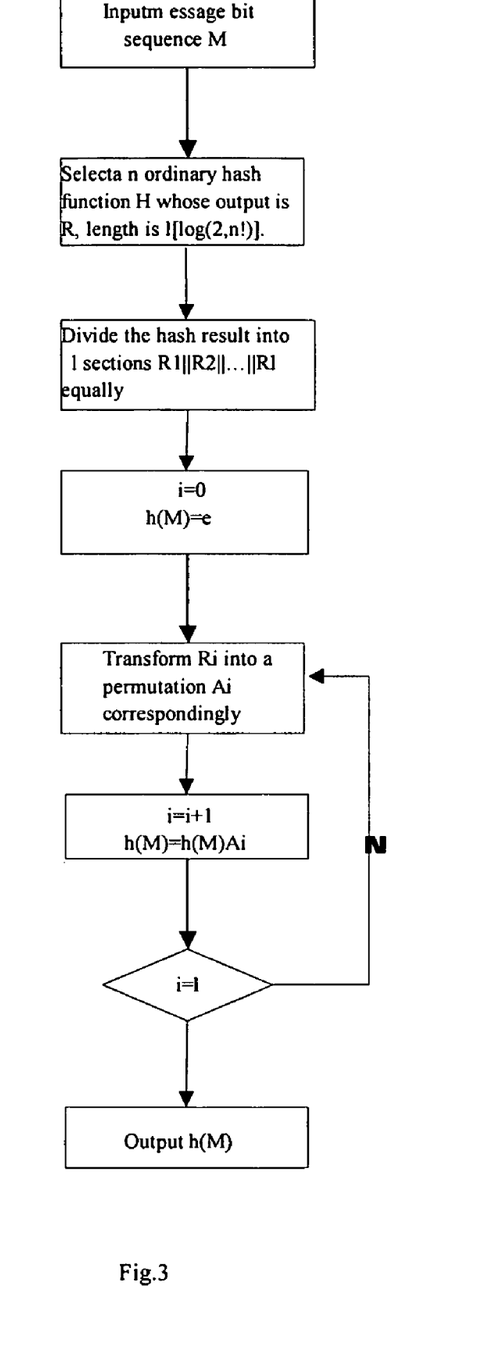
FIG. 3 is the process flowchart of one-direction hash function h in a digital signature scheme of the present invention.

Calculating and obtaining y=h(M) by using hash function h, with its flowchart shown in FIG. 3:

For a hash function h mapping from bit sequence {0,1}* to braid group B$_n$(l), first compress {0,1}* to obtain a bit sequence {0,1}$^N$ with fixed length by using an ordinary hash function, wherein N=l[log$_2$n']. Then divide {0,1}$^N$ into l sections r$_1$||r$_2$|| . . . ||r$_1$, the length of each section is [log$_2$n']. Because the number of permutation braid of B$_n$(l) is n!, a one to one map can be established between the permutation braid and the integer set [0,n!-1], and transform r$_k$ into a certain integer in [0,n!-1], which in turn is further transformed into a permutation braid P$_k$, at last, obtain $$h(M) = \prod_{k=1}^{l} P_k.$$

Figure 4:
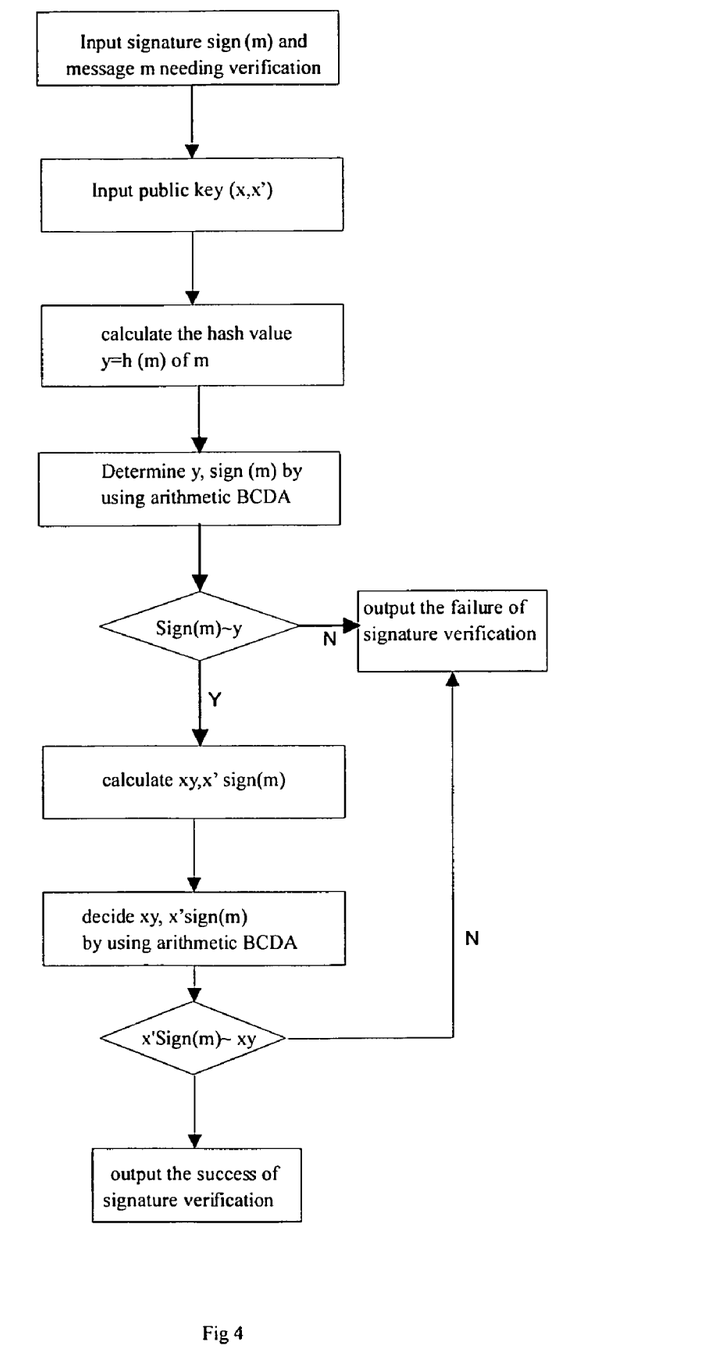
FIG. 4 is the flowchart of verifying digital signature based on braid group conjugacy problem of the present invention.

The verifying flowchart of the present invention for a digital signature scheme based on braid group conjugacy problem is shown in FIG. 4, including the following steps of:

Step 20. the signature verifying party V obtaining the public key S after receiving the message M and the signature of M Sign(M) transmitted by signatory S;

Step 21. calculating message M by using system parameter hash function h, obtaining y=h(M);

Step 22. judging whether sign(M) and y are conjugate, if not, sign(M) is not a legal signature, the verification is failed; if yes, performing step 23; and Step 23. calculating sign(M) x' and xy by using the obtained public key of S, and judging whether they are conjugate, if not, then sign(M) is not a legal signature, verification is failed; if yes, then sign(M) is the legal signature of message M In the method, the form of obtaining public key of S in step 20 is an out-band form, or it is transmitted to verifying part V by signatory S directly.

Figure 5:
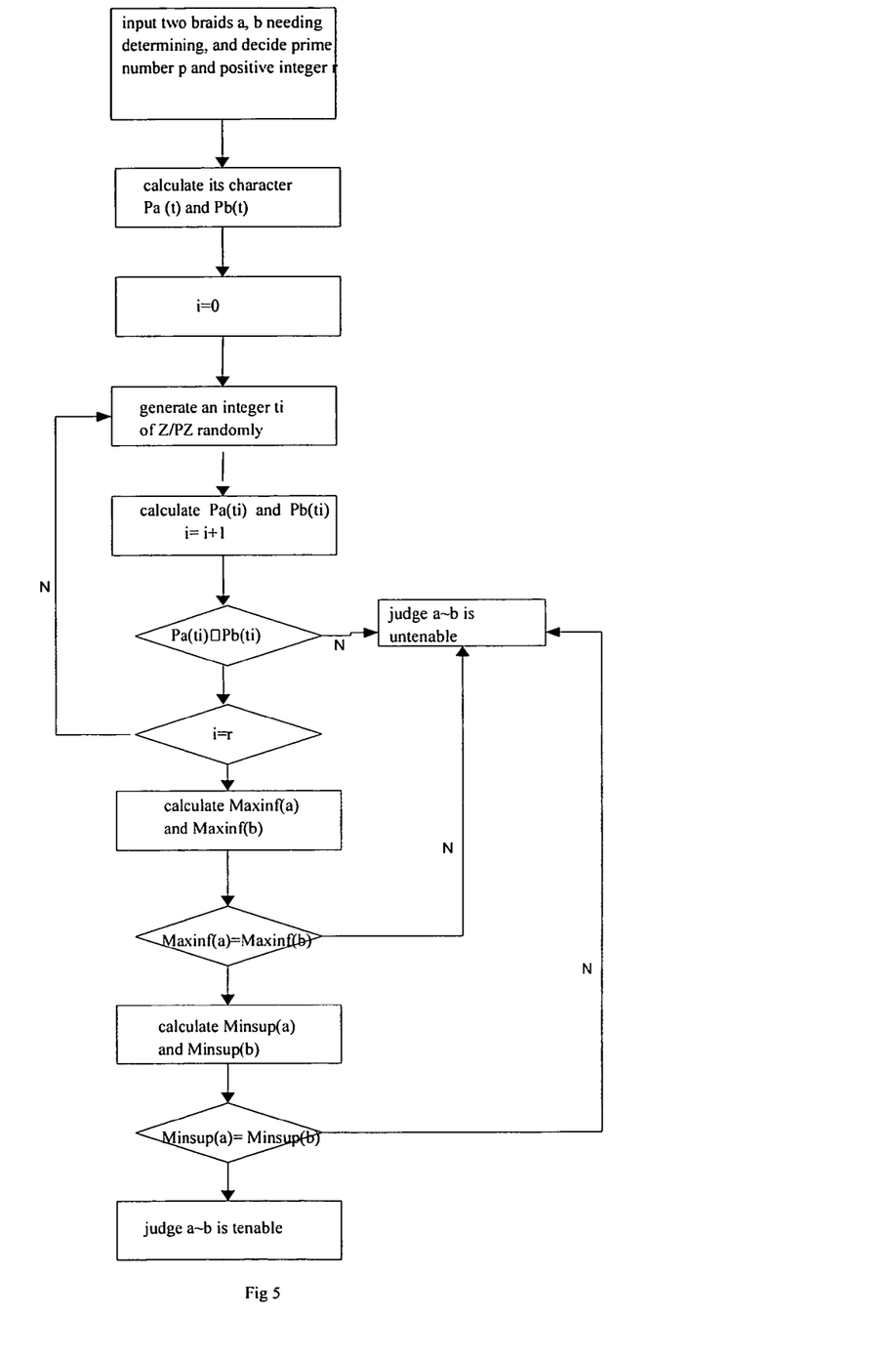
FIG. 5 is the process flowchart of determination algorithm BCDA of CDP problem of the present invention.

The arithmetic of BCDA is employed in judging whether sign(M) and y are conjugate in step 22 and judging whether sign(M) x' and xy are conjugate in step 23. This arithmetic of BCDA is shown in FIG. 5:

For any non-abelian group, they all have a function from group to ring, which is invariant under conjugacy, and is called character. Defining a function from B$_n$(l) to Laurent multinomial ring Z[t,f$^{-1}$]:g→det(Φ(g)−I), wherein g∈B$_n$(l), Φ(g) is the Burau representation of g, I is unity matrix, det( ) is the determinant of the matrix, it is obvious that the function is the character of B$_n$(l). det(Φ(g)−I) is called Alexander multinomial of braid g, called P$_g$(t). Obviously, for a g∈B$_n$(l), the degree of its Alexander multinomial P$_g$(t): ∂(P$_g$(t))≦l(n−1)n/2. Judging whether the two braids a,b∈B$_n$(l) are conjugate, and perform the following Alexander test: determine system parameter prime number p and positive integer r, select r different value t$_1$, t$_2$ . . . t$_r$ on the finite field Z/pZ freely, if for all the t$_i$(i=1, 2 . . . r), there is always P$_a$(t$_i$)=P$_b$(t$_i$), then output 1, otherwise output 0. Because ∂(P$_a$(t)−P$_b$(t))≦l(n−1)n/2, the equation P$_a$(t)−P$_b$(t)=0 has only l(n−1)n/2 roots. So the probability $$Pr[P_a(t) \neq P_b(t)|\text{the output of Alexander test is 1}] \leq \left(\frac{l(n-1)n}{2p}\right)^r,$$

and obviously, with the increase of p and r, this probability can be decreased freely. The complexity of Alexander test calculation is O(rn$^3$).

Maxinf-Minsuptest. For x∈B$_n$(l) of braid, define Maxinf (x)=Max{inf(y)|y~x,y∈B$_n$(l)}, Minsup(x)=Min{sup(y)|y~x, y∈B$_n$(l)}. The called Maxinf-Minsup test is, for braid a,b∈B$_n$(l), judgeing whether Maxinf(a)=Maxinf(b), Minsup(a)=Minsup(b) is yes, if yes, then output 1, if no, then output 0. Next, the arithmetic for calculating Maxinf(x) and Minsup(x) is described. Firstly, define two operations, if x=Δ$^u$π$_1$π$_2$ . . . π$_1$, cycling(x)=(τ$^u$(π$_1$))$^{-1}$xτ$^u$(π$_1$), decycling(x)=π$_1^{-1}$xπ$_1$. Perform cycling(decycling) operation for x circularly, until the value of inf begins to increase (sup value begins to reduce), then consider the currently obtained braid as new braid, repeat the circular operation, and the count of circular times is reset to 1; if the circular times are counted until m=n(n−1)/2, the inf value does not increase any more(sup value does not reduce any more), then the inf value of current braid is Maxinf (x)(Minsup(x). As for the theory analysis of arithmetic, please refer to the following quotations: J. S. Birman, K. H. Ko and S. J. Lee, *The in.mum, supremum and geodesic length of a braid conjugacy class, to appear in Advances in Mathematics*. The arithmetic complexity of the arithmetic is O(l$^2$n log n).

If braids a, b pass the Alexander test and Maxinf-Minsup test, then determine that a~b is right, with one exception of a~b$^{-1}$. However, for a and b selected randomly, this exception is nearly impossible, and for hacker, it is also impossible to use such excluded situation, as for its analysis, please refer to the following quotations: K. H. Ko, S. J. Lee, J. H. Cheon, J. W. Han, J. S. Kang and C. S. Park, *New Public-Key Crytosystem Using Braid Groups*, Proc. of Crypto 2000, LNCS 1880, Springer-Verlag (2000) 166-183.

For a legal signature sign(M), because sign(M)=a$^{-1}$by b$^{-1}$a=(b$^{-1}$a)$^{-1}$yb$^{-1}$a, sign(M)~y is right; while for x'sign(M)= a$^{-1}$xa a$^{-1}$byb$^{-1}$a=a$^{-1}$xbyb$^{-1}$a, because x∈LB$_m$, b∈RB$_{n-1-m}$, xb=bx, therefore x' sign(M)=a$^{-1}$xa a$^{-1}$byb$^{-1}$a=a$^{-1}$xby b$^{-1}$a=a$^{-1}$ bxyb$^{-1}$a=(b$^{-1}$a)$^{-1}$(x y)(b$^{-1}$a), and x' sign(M)~xy, therefore, a legal signature can always pass the verification at last.

Figure 6:
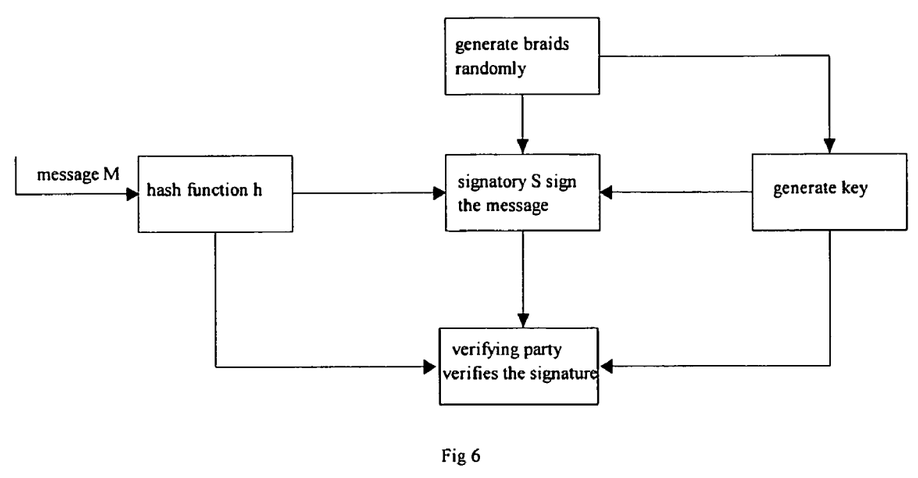
FIG. 6 is the flowchart of digital signatures of signatory and verifying party and the verifying method based on braid group conjugacy problem of the present invention.

The present invention also provides a digital signature scheme including signatory and verifying party signatures and a verification thereof, see FIG. 6. As the digital signature scheme and its verifying method of the present based on braid conjugacy problem, the signatory uses hash function h for message M needing signature, obtaining y=h(M)∈B$_n$(l), and generating key, generating b∈RB$_{n-1-m}$(l) randomly, the signatory transmits the message M and signature of M Sign(M) to the verifying party after obtaining Sign(M)=a$^{-1}$byb$^{-1}$a by signing message M with its own private a and the generated braid b, the verifying party obtains y=h(M) and the public key verification signature message M by calculating message M by hash function h, the detailed process is as follows:

Step 1. the signature S selecting three braids x∈LBm(l), x'∈$B_n$(l), a∈$B_n$(l), making them meeting x'=$a^{-1}$xa. and with the known x and x', it is impossible to find a on calculation, and considering braid pair (x',x) as public key of S, and braid a as private key of S;

Step 2. signatory S obtaining y=h(M)∈$B_n$(l) by using hash function h for message M needing signature;

Step 3. generating a braid b∈$RB_{n-1-m}$(l) randomly, then obtaining Sign(M)=$a^{-1}$by$b^{-1}$a by signing the message M with its own private key a and the generated random braid b;

Step 4. the signatory S transmitting message M and its signature Sign(M) to the signature verifying party V;

Step 5. the signature verifying party V obtaining the public key of S after receiving the message M and its signature Sign(M) transmitted by signatory S;

Step 6. calculating message M by using system parameter hash function h, obtaining y=h(M);

Step 7. judging whether sign(M) and y are conjugate, if not, sign(M) is not a legal signature, the verification is failed; if yes, performing step 8; and Step 8. calculating sign(M) x' and xy by using the obtained public key of S, and judging whether they are conjugate, if not, sign(M) is not a legal signature, the verification is failed; if yes, sign(M) is the legal signature of message M;

Because the braid group is infinite group, in order to realize by computer, system parameter has to be set. First set system parameters n, l, d (preferred l=3,d=4). Make $B_n$(l)={b∈$B_n$|0≦inf(b), sup(b)≦l}, then |$B_n$(l)|<(n!)$^l$ is finite. For the same reason, $LB_m$(l)={b∈$LB_m$|0≦inf(b), sup(b)≦l}, $RB_{n-1-m}$(l)={b∈$RB_{n-1-m}$|0≦inf(b), sup(b)≦l}. For a braid, it is denoted by Burau representation which currently is acknowledged to have the fastest calculation speed on computer, that is, denoted by a (n−1)×(n−1) order matrix on the Laurent multinomial ring Z[t,$t^{-1}$], the specified permutation rule is as follows:

Perform the following permutation:

$$\sigma_1 = \begin{bmatrix} -t & & & & \\ 1 & 1 & & & \\ & & O & & \\ & & & O & \\ & & & & 1 \end{bmatrix}$$

$$\sigma_2 = \begin{bmatrix} 1 & t & & & \\ & -t & & & \\ & 1 & 1 & & \\ & & & O & \\ & & & & 1 \end{bmatrix} \ldots$$

$$\sigma_i = \begin{bmatrix} O & & & & \\ & 1 & t & & \\ & & -t & & \\ & & 1 & 1 & \\ & & & & O \end{bmatrix}$$

$$\sigma_{n-1} = \begin{bmatrix} 1 & & & & \\ & O & & & \\ & & O & & \\ & & & 1 & t \\ & & & & -t \end{bmatrix}$$

the calculation complexity for a braid belonging to $B_n$(l) transforming to a Burau representation is O(ln). With the above representation, the group operation and converse operation are transformed to the multiplication of matrix and converse operation, all of which can be solved by efficient mathematics tool, their calculation complexity is O(ln).

The method of the present invention can be realized by software. In order to improve speed, the arithmetic BCDA can also be realized by hardware, in which, the determined system parameter discloses: braid group parameters n, l, d, p (preferred n between 20~30, l=3, d=4, p between $2^{31}$~$2^{32}$), and the size of the left braid group m (preferred n−m is about 4); determining the hash function h used in hash message; the process of signatory S is as following:

Key Generation:
1. generating a braid x∈$LB_m$ by using arithmetic PBG at random;
2. obtaining public key (x',x) and private a by using arithmetic RSSBG(x,d).

The signature process:
1. applying hash function h to message M needing signature, obtaining y=h(M)
2. generating a braid b randomly, then calculating by$b^{-1}$; and
3. calculating sign(M)=$a^{-1}$by$b^{-1}$a by using private key.

The process of verifying party V:
1. applying hash function h to the message M needing its signature verified, obtaining y=h(M);
2. judging whether sign(M)~y is right by using arithmetic BCDA, if not, the verification is failed, ending; if yes, performing step 3; and
3. calculating x' sign(M) and xy; judging whether x' sign(M)~xy is right by using arithmetic BCDA, if yes, the verification is passed, ending, otherwise, the verification is failed, ending.

At last, it should be noted that the above embodiment is only to illustrate the technical scheme of the present invention without any limitation. Although the present invention is described in detail with reference to the preferred embodiment, the ordinary skilled person in the art should understand that the scheme of the present invention can be modified or substituted, without departing from the spirit and scope of the technical scheme of the present invention, all of which should be covered in the following claims.

What is claimed is:

1. A digital signature method to be performed by a computer based on braid group conjugacy problem, parameters involved in this method comprising a signatory (S), a signature verifying party (V), a message (M) needing signature, a braid group $B_n$(l) divided into a left subgroup $LB_m$(l) and a right subgroup $RB_{n-1-m}$(l), an integer n for a number of generators in the braid group $B_n$(l), an integer m for a number of generators in a left subgroup $LB_m$(l), an integer l for an upper bound of a length of a braid, a one way hash function h from bit sequence {0, 1}* to braid groups $B_n$(l); said signature method comprising the following steps of:

Step 1. the signatory (S) selecting a braid x generated from the left subgroup $LB_m(l)$, a second braid x' generated from the braid group $B_n(l)$, and a third braid a generated from the braid group $B_n(l)$, by the computer, wherein the computer is adapted to making them meet x'=a'xa, and considering braid pair (x',x) as a public key of signatory (S), a as a private key of signatory (S);

Step 2. signatory (S) using hash function h for message (M) needing signature, by the computer, wherein the computer is adapted to get y=h(M) from the braid group $B_n(l)$;

Step 3. generating a braid b from the right subgroup $RB_{n-1-m}(l)$ at random, by the computer, wherein the computer is adapted to signing the message (M) with the private key a and a generated random braid b to obtain Sign(M)=$a^{-1}byb^{-1}a$; and Step 4. the signatory (S) outputting, by the computer, message (M) and a signature of message (M) Sign(M).

2. The digital signature method based on braid group conjugacy problem according to claim 1, wherein generating the public key braid pair (x',x) and the private key braid a of signatory (S) in said step 1 comprises the following steps of:

Step 1a. selecting a distance d between system parameter braid groups public key pairs;

Step 1b. representing x into a left canonical form x=$\Delta^u \pi_1 \pi_2 \ldots \pi_i$;

Step 1c. selecting a braid b at random to belong to a set $B_n(5 \; l)$

Step 1d. calculating x'=$b^{-1}xb$, a=b;

Step 1e. generating a bit at random, if 1, calculating x'=decycling(x'), a=$a\pi_i$; if not 1, calculating x'=cycling (x'), a=$a\tau^u(\pi_1)$;

Step 1f. judging whether x' belongs to SSS(x) and whether l(x')≦d, if all the conditions are yes, outputting the braid pair (x, x') as the public key, a as the private key; if either of them is not, performing step 1e.

3. The digital signature method based on braid group conjugacy problem according to claim 1, wherein the process for obtaining y=h(M)∈$B_n(l)$ by using the hash function h in said step 2 comprises the following steps of:

Step 2a, selecting an ordinary hash function H, with a length of output H(M) is l [ log(2,n!)], then dividing H(M) into l sections $R_1 \| R_2 \| \ldots \| R_l$ in equal at one time;

Step 2b, corresponding Ri to a permutation braid Ai, then calculating h(M)=A1*A2 . . . Al, that is the h(M) required.

4. The digital signature method based on braid group conjugacy problem according to claim 1, wherein a integer n for the number of generators in a braid group is in the range of 20~30, an upper value of the braid length is l=3, d=4, and an left subgroup n−m=4.

5. A method for digital signature to be performed by a computer configured to calculate data based on braid groups conjugacy problem and verification thereof, parameters involved in this method comprising a signatory (S), a signature verifying party (V), a message (M) needing signature, a braid group $B_n(l)$ divided into a left subgroup $LB_m(l)$ and a right subgroup $RB_{n-1-m}(l)$, an integer n for a number of generators in the braid group $B_n(l)$, an integer m for a number of generators in the left subgroup $LB_m(l)$, an integer l for an upper bound of a length of a braid, a one way hash function h mapped from bit sequence {0,1}* to braid groups $B_n(l)$; comprising the following steps of:

Step 1. the signatory (S) selecting a braid x generated from the left subgroup $LB_m(l)$, a second braid x' generated from the braid group $B_n(l)$, and a third braid a generated from the braid group $B_n(l)$, by the computer, wherein the computer is adapted to making them meet x'=$a^{-1}xa$, and considering braid pair (x',x) as a public key of signatory (S), a as a private key of signatory (S);

Step 2. signatory (S) using a hash function h for message (M) needing signature, by the computer, wherein the computer is adapted to get y=h(M) from the braid group $B_n(l)$;

Step 3. generating a braid b from the right subgroup $RB_{n-1-m}(l)$ at random, by the computer, wherein the computer is adapted to signing the message (M) with the private key a and the braid b generated randomly to obtain Sign(M)=$a^{-1}byb^{-1}a$;

Step 4. the signatory (S) outputting, by the computer, the message (M) and its signature Sign(M) to the signature verifying party (V);

Step 5. the signature verifying party (V) obtaining, by the computer, the public key of signatory (S) after receiving the message (M) and the signature of message (M) Sign (M) transmitted from signatory (S);

Step 6. calculating message M, by the computer, wherein the computer is adapted to calculate message M by employing a system parameter hash function h, to obtain y=h(M);

Step 7. judging whether sign(M) and y are conjugate or not, by the computer, wherein the computer is adapted to perform the judging; if not, sign (M) is an illegal signature, the verification fails; if yes, perform step 8; and Step 8. calculating sign(M)x' and xy, by the computer, wherein the computer is adapted to calculate sign(M)x' and xy by using the obtained public key of signatory (S), and judging whether they are conjugate or not, if not, sign(M) is an illegal signature, and the verification fails; if yes, sign(M) is a legal signature of message (M).

6. The method according to claim 5, wherein generating the public key braid pair (x',x) and private key braid a of signatory (S) in said step 1 comprises the following steps of:

Step 1a. selecting a distance d between system parameter braid groups public key pair;

Step 1b. representing x into left canonial form x=$\Delta^u \pi_1 \pi_2 \ldots \pi_i$;

Step 1c. selecting a braid b at random to belong to set $B_n(5 \; l)$

Step 1d. calculating x'=$b^{-1}xb$, a=b;

Step 1e. generating a bit at random, if 1, calculating x'=decycling(x'), a=$a\pi_i$; if not 1, calculating x'=cycling (x'), a=$a\tau^u(\pi_1)$; and Step 1f. judging whether x' belongs to SSS(x) and whether l(x')≦d, if all conditions are yes, outputting the braid pair(x, x') as the public key, a as the private key; if either of them is not, performing step 1e.

7. The method according to claim 5, wherein the process for obtaining y=h(M)∈$B_n(l)$ by using hash function h in said step 2 comprises the following steps of:

Step 2a. selecting an ordinary hash function H, with a length of its output H(M) is l [ log(2,n!)], then dividing H(M) into l sections $R_1 \| R_2 \| \ldots \| R_l$ in equal at one time; and Step 2b. corresponding Ri to a permutation braid Ai, then calculating h(M)=A1*A2 . . . Al, that is the h(M) required.

8. The method according to claim 5, wherein n for the number of the generation braids in the braid group is in the range of 20~28, an upper value of the braid length is l=3, d=4, and an left subgroup n−m=4.

9. The method according to claim 5, wherein algorithm BCDA is employed in judging whether sign(M) and y are conjugate or not in step 7 and judging whether sign(M)x' and xy are conjugate or not in step 8.

10. The digital signature method based on braid group conjugacy problem according to claim 2, wherein a integer n for the number of generators in a braid group is in the range of 20~28, an upper value of the braid length is l=3, d=4, and an left subgroup n−m=4.

11. The digital signature method based on braid group conjugacy problem according to claim 3, wherein a integer n for the number of generators in a braid group is in the range of 20~28, an upper value of the braid length is l=3, d=4, and an left subgroup n−m=4.

12. The method according to claim 6, wherein n for the number of the generation braids in the braid group is in the range of 20~28, an upper value of the braid length is l=3, d=4, and an left subgroup n−m=4.

13. The method according to claim 7, wherein n for the number of the generation braids in the braid group is in the range of 20~28, an upper value of the braid length is l=3, d=4, and an left subgroup n−m=4.

\* \* \* \* \*